United States Patent
Kurita et al.

(10) Patent No.: US 7,372,474 B2
(45) Date of Patent: May 13, 2008

(54) IMAGE DISPLAY CONTROLLING APPARATUS AND METHOD, IMAGING APPARATUS AND VIEWFINDER DEVICE

(75) Inventors: Susumu Kurita, Kanagawa (JP); Norihiko Kawada, Kanagawa (JP); Taku Kihara, Kanagawa (JP); Yoshihiro Morioka, Kanagawa (JP)

(73) Assignee: Sony Corporation (JP)

( * ) Notice: Subject to any disclaimer, the term of this patent is extended or adjusted under 35 U.S.C. 154(b) by 500 days.

(21) Appl. No.: 10/700,416

(22) Filed: Nov. 4, 2003

(65) Prior Publication Data

US 2004/0095363 A1    May 20, 2004

(30) Foreign Application Priority Data

Nov. 19, 2002    (JP)    ............................. 2002-335582

(51) Int. Cl.
  G09G 5/10    (2006.01)
(52) U.S. Cl. ................... 345/690; 345/211; 345/102
(58) Field of Classification Search ............... 345/102, 345/211–212, 690–691
  See application file for complete search history.

(56) References Cited

U.S. PATENT DOCUMENTS 5,184,117 A    2/1993    Gauthier
5,933,089 A *  8/1999    Katada ...................... 340/7.55
6,411,306 B1 * 6/2002    Miller et al. ................ 345/690
6,466,196 B1  10/2002    Isogawa et al.
7,119,786 B2 * 10/2006    Cui ............................ 345/102

FOREIGN PATENT DOCUMENTS

| EP | 0 682 448 A2 | 11/1995 |
| EP | 0 979 003 A2 | 2/2000 |
| EP | 1 111 578 A1 | 6/2001 |
| JP | 05-292364 A1 | 11/1993 |
| JP | 08-191408 A1 | 7/1996 |
| JP | 2001-305637 A1 | 11/2001 |

* cited by examiner

Primary Examiner—Amr A. Awad
Assistant Examiner—Michael Pervan
(74) Attorney, Agent, or Firm—Lerner, David, Littenberg, Krumholz & Mentlik, LLP

(57) ABSTRACT

An apparatus and a method for flexibly adjusting the contrast of an input image signal. Specifically, a control signal for controlling the contrast of a displayed image is generated responsive to an input image signal, and the luminance signal level of the input image signal is adjusted on the basis of the generated control signal. A display image for demonstration via a liquid crystal display surface is generated on the basis of the adjusted luminance signal level. The illumination brightness on the liquid crystal display surface is controlled in correlation with the adjustment of the luminance signal level on the basis of the generated control signal.

13 Claims, 5 Drawing Sheets

IMAGE DISPLAY CONTROLLING APPARATUS AND METHOD, IMAGING APPARATUS AND VIEWFINDER DEVICE

BACKGROUND OF THE INVENTION

1. Field of the Invention

This invention relates to a method and an apparatus for controlling an image demonstrated on a liquid crystal display surface based on an input image signal or a photographed image signal, and to an imaging method and apparatus. More particularly, it relates to a method and apparatus for controlling an image, which may be convenient for adjusting the contrast, and to an imaging method and apparatus.

2. Description of Related Art

In an imaging apparatus, typified e.g. by a video camera, an image for photographing is displayed on a screen of an electronic viewfinder formed by light modulating elements, such as liquid crystal display devices. On the back surface of this electronic viewfinder, there is mounted a backlight formed e.g. by a planar phosphor tube. This backlight is caused to emit light to illuminate the liquid crystal display device from the back side to improve the viewing characteristics.

For causing the backlight to emit light, horizontal synchronization signals are first separated from the input image signal. Responsive to the separated horizontal synchronization signals, pulse signals are generated and supplied to a backlight driving circuit. FIG. 1 shows pulse signals generated in succession at a period of the horizontal frequency $f_H$. By providing the horizontal blanking period, it becomes possible to synchronize the period of light emission of the backlight with the image display state to prevent flickering of the displayed image.

Moreover, by changing the illumination brightness of the backlight, it becomes possible to adjust the contrast of the image displayed on the electronic viewfinder. That is, by changing the pulse width $P_W$ of the pulse signal of FIG. 1, supplied to a driving circuit of the backlight, it is possible to control the average current value $I_E$ indicative of the illumination brightness. For decreasing or increasing the illumination brightness of the backlight, the pulse width $P_W$ may be narrowed or widened, respectively. Such control of the average current value $I_E$, implemented by changing the pulse width $P_W$ in this manner, has so far been implemented using a pulse width modulation circuit (PWM circuit). With the PWM circuit, the ON/OFF period of the pulse signal is controlled to change the pulse width $P_W$.

Meanwhile, if, when the signal level of the input image signal is extremely small, the pulse signals are turned on and off using the PWM circuit as described above to effect the backlight switching, this switching operates as a noise, thus severely disturbing the displayed image.

With this in view, a dimmer system 140 for controlling the light emitting brightness of a backlight 130 by controlling the amplitude of the boosting AC voltage, as shown in FIG. 2, has been proposed.

This dimmer system 140 is made up by a DC power supply Ba, a dimmer control IC circuit 141, a dimmer switching transistor 142, an inductor 143 and a Royer oscillator 150.

The dimmer control IC circuit 141 includes an input terminal 141a, by which it receives a control signal controlling the brightness of the backlight 130 to output pulses in dependence on the control signal level. The dimmer switching transistor 142 has its duty controlled based on pulses from the dimmer control IC circuit 141 to make intermittent current supply from the DC power supply Ba to the inductor 143. The inductor 143 sends the DC voltage, intermittently supplied by the dimmer switching transistor 142, to the Royer oscillator 150. This Royer oscillator 150 generates the boosting AC voltage based on the DC voltage supplied from the inductor 143. This boosting AC voltage is supplied via a capacitor, not shown, to the backlight 130 to cause the current to flow through the phosphor tube. This enables the dimmer system 140 to dim and turn on the backlight 130.

That is, with this dimmer system 140, the amplitude of the boosting AC voltage may be changed by the value of the DC voltage supplied from the DC power supply Ba to allow control of the average current value $I_E$.

However, with the above-described conventional dimmer system 140, the smallest value of the average current value $I_E$ is limited from the perspective of maintaining a stable discharge current of the backlight. Consequently, since the entire image becomes lighter, there is raised a problem that, especially if an image signal of a black level is input, the black color is displayed in a floating fashion, while the range of possible variation of contrast is reduced. In particular, since the illumination brightness of the conventional backlight is controlled independently of the luminance signal level of the displayed image, the contrast of an actually demonstrated image cannot be flexibly adjusted in relation to the input image signal.

SUMMARY OF THE INVENTION

In view of the above-depicted status of the art, it is an object of the present invention to provide an image display controlling method and apparatus and an imaging method and apparatus whereby the contrast of a displayed image may be flexibly adjusted in relation to the input image signals.

In one aspect, the present invention provides an image display controlling apparatus comprising control signal generating means for generating a control signal for controlling the contrast of a displayed image, in dependence on an input image signal, level adjustment means for adjusting the level of a luminance signal of the input image signals, based on the control signal supplied from the control signal generating means, display means for demonstrating a displayed image which is in keeping with the level of the luminance signal adjusted by the level adjustment means, illuminating means for illuminating the display means, and illumination controlling means for controlling the illumination brightness by the illuminating means, in a correlated fashion with the level adjustment means, based on a control signal supplied from the control signal generating means.

In another aspect, the present invention provides an image display controlling method comprising generating a control signal for controlling the contrast of a displayed image, in dependence on an input image signal, adjusting the level of a luminance signal of the input image signal, based on the control signal generated, demonstrating a displayed image which is in keeping with the level of the luminance signal adjusted, and controlling the illumination brightness for the display unit, in a correlated fashion with the adjustment of the luminance signal level, based on the generated control signal.

In still another aspect, the present invention provides an imaging apparatus comprising image signal generating means for imaging an object to generate an image signal, control signal generating means for generating a control signal for controlling the contrast of a displayed image responsive to the image signal, level adjustment means for adjusting the signal level of a luminance signal in the input image signal, based on the control signal for controlling the contrast of a displayed image, display means for displaying a displayed image which is in keeping with the signal level of the luminance signal adjusted by the level adjustment means, illuminating means for illuminating the display means, and illumination controlling means for controlling the illumination brightness by the illumination means in correlated fashion with the level adjustment means based on the control signal supplied from the control signal generating means.

In yet another aspect, the present invention provides a viewfinder device for demonstrating an image corresponding to an image signal for monitoring, supplied from an imaging apparatus, in which the viewfinder device comprises control signal generating means for generating a control signal for controlling the contrast of a displayed image, in dependence on the image signal supplied, level adjustment means for adjusting the level of a luminance signal of the input image signals, based on the control signal supplied from the control signal generating means, display means for demonstrating a displayed image which is in keeping with the level of the luminance signal adjusted by the level adjustment means, illuminating means for illuminating the display means, and illumination controlling means for controlling the illumination brightness by the illuminating means, in a correlated fashion with the level adjustment means, based on a control signal supplied from the control signal generating means.

With the image display controlling method and apparatus, according to the present invention, a control signal for controlling the contrast of the display image is generated, in dependence on the input image signal and, based on the so generated control signal, the illumination brightness on the liquid crystal display surface is controlled in a correlated fashion with the adjustment of the level of the luminance signal of the input image signal. Thus, according to the present invention, it is possible to flexibly adjust the contrast of the image actually demonstrated on the liquid crystal display unit.

With the imaging apparatus according to the present invention, an object is imaged to generate an image signal, a control signal for controlling the contrast of the displayed image is generated, in dependence on the so generated image signal and, based on the so generated control signal, the illumination brightness on the liquid crystal display surface is controlled in a correlated fashion with the adjustment of the luminance signal level of the input image signal. Thus, according to the present invention, it is possible to flexibly adjust the contrast of an image actually demonstrated on the liquid crystal display unit, even though the image is the photographed image of the object.

Moreover, with the viewfinder device according to the present invention, a control signal for controlling the contrast of a displayed image is generated, in dependence on the image signal, supplied from the imaging apparatus, and the illumination brightness on the liquid crystal display surface is controlled in correlated fashion with adjustment of the luminance signal level of the input image signal. Thus, according to the present invention, the contrast of the image actually demonstrated via the liquid crystal display unit may be flexibly adjusted without dependency on the performance of the imaging apparatus.

DESCRIPTION OF THE PREFERRED EMBODIMENTS

Figure 1:
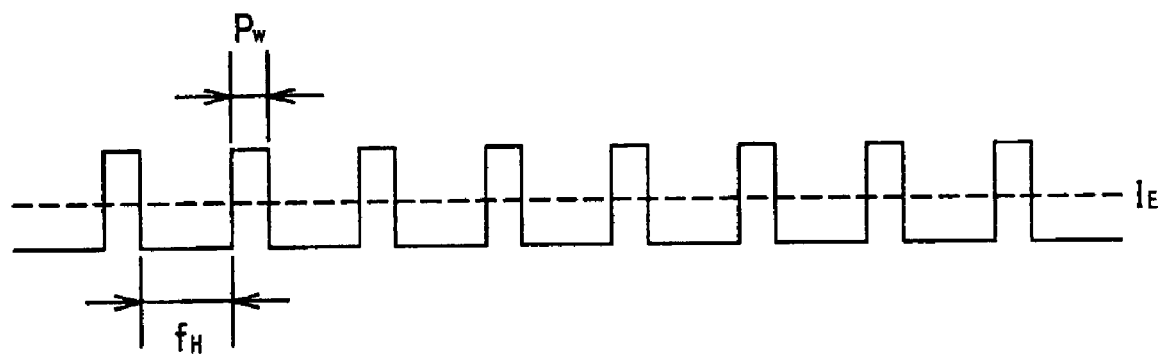
FIG. 1 is a waveform diagram of a pulse signal supplied to a backlight driving circuit.
Figure 2:
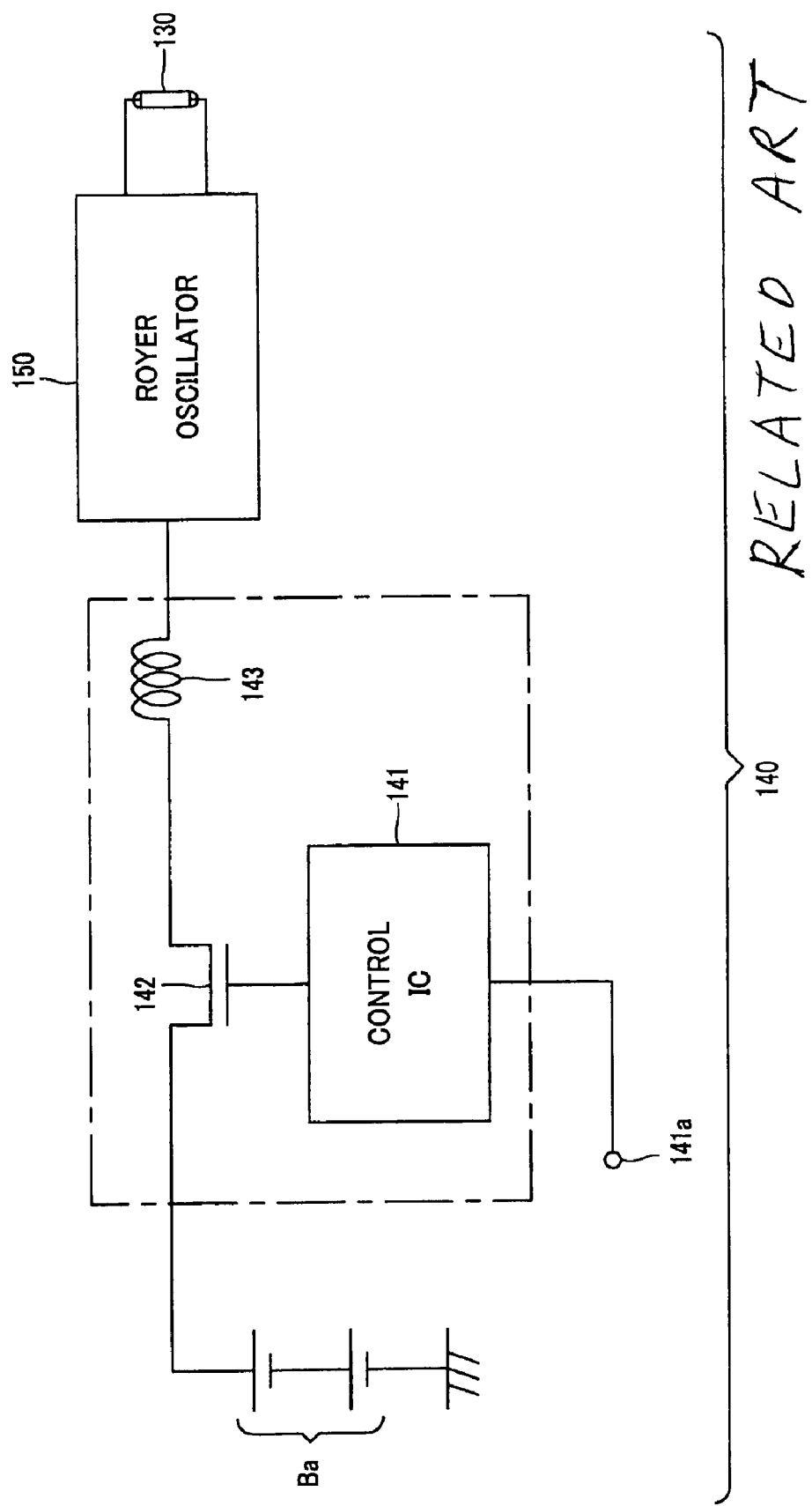
FIG. 2 shows an instance of a dimming system used for controlling the brightness of light emission of a backlight.
Figure 3:
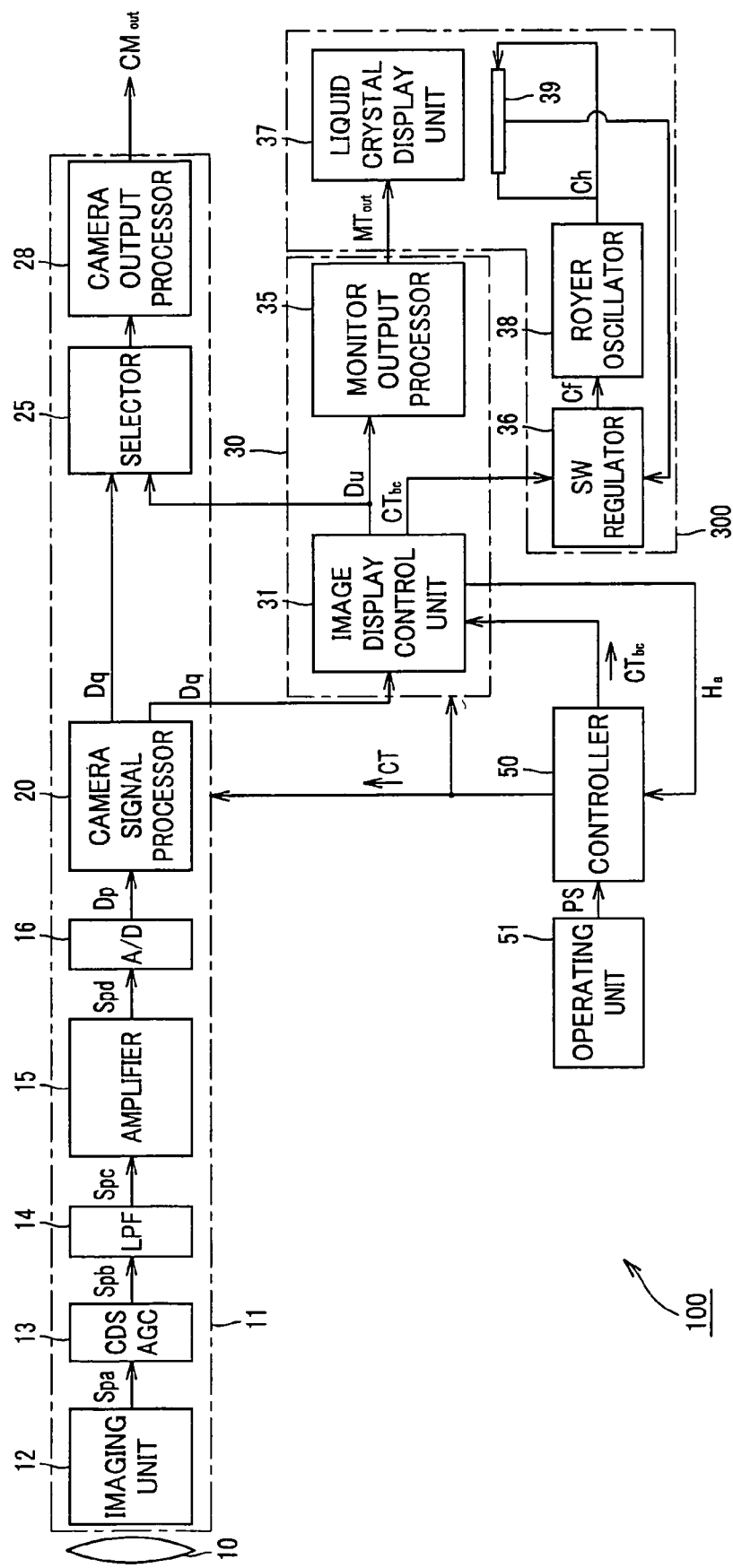
FIG. 3 is a block diagram showing the structure of a video camera embodying the present invention.

Referring to the drawings, preferred embodiments of the present invention will be explained in detail. The present invention is applied to a video camera 100 configured as shown for example in FIG. 3.

This video camera 100 includes an imaging unit 12, on which the imaging light is incident through an imaging lens system 10, and a main line block 11 for generating an imaging output signal CMout which is in keeping with the equipment connected to the video camera 100, from an imaging signal Spa by the imaging unit 12, and for outputting the so generated imaging output signal. The video camera 100 also includes a monitor block 30 for generating an imaging output signal for monitoring MTout from an image signal Dq obtained from the main line block 11 to output the so generated imaging output signal, and a viewfinder 300 for displaying the image corresponding to the imaging output signal for monitoring MTout supplied from the monitor block 30. The video camera 100 also includes a controller 50 for controlling the operation of the monitor block 30 and the viewfinder 300, and an operating unit 51 for supplying an operating signal PS corresponding to the user actuation to the controller 50.

In this video camera 100, the light incident through the imaging lens system 10 is incident on the imaging unit 12 of the main line block 11 to form an object image on an imaging surface. The imaging unit 12 is made up of a solid-state imaging device, such as a CCD image sensor, and generates the imaging signal Spa of three prime colors corresponding to the object image by photo-voltaic conversion to send the so generated imaging signal to a CDS (Correlated Double Sampling)/AGC (Auto Gain Control) 13.

The CDS/AGC 13 executes correlated double sampling to remove noise components from the imaging signal Spa. The resulting signal, freed of the noise components, is amplified to a predetermined signal level and supplied as an imaging signal Spb to a low-pass filter (LPF) 14. Form the imaging signal Spb, supplied from the CDS/AGC 13, the LPF 14 extracts spectral components of the original signal and routes the so extracted signal as an imaging signal Spc to an amplifier 15. The amplifier 15 amplifies the supplied imaging signal Spc to form an imaging signal Spd which is then supplied to an A/D converter 16. This A/D converter 16 converts the supplied imaging signal Spd into a digital imaging signal Dp which is then supplied to a camera signal processing unit 20.

The camera signal processing unit 20 performs signal processing on the supplied imaging signal Dp in order to produce a satisfactory photographed image. For example, the camera signal processing unit performs signal processing, such as shading correction, masking correction, knee correction, y-correction or contour compensation to generate the image signal Dq from the imaging signal Dp to route the so generated image signal Dq to a selector 25 and to an image display control unit 31 of the monitor block 30.

The image display control unit 31 generates an image signal Dr of a brightness reference image, as a reference in discriminating the brightness of the image for photographing and, using this image signal Dr and the image signal Dq supplied from the camera signal processing unit 20, generates an adjusted image signal. The image display control unit 31 performs signal processing on the generated image signals, such as brightness or contrast adjustment, and sends the generated image signal Du to a monitor output processor 35 and to the selector 25 of the main line block 11. This image display control unit 31 will be explained in detail subsequently.

The selector 25 selects one of the image signal Dq, supplied from the camera signal processing unit 20, and the image signal Du, supplied from the camera signal processing unit 20, based on the control signal from the controller 50, as later explained, to send the so selected signal to a camera output processor 28.

The camera output processor 28 converts the image signal Dq or the image signal Du, supplied from the selector 25, to the signal CMout which is in keeping with the equipment connected to the video camera. For example, if it is the equipment designed to cope with component signals or the equipment designed to cope with composite signals, that is connected to the video camera, the camera output processor converts the image signal Dq or Du into the signal CMout which is in keeping with the respective equipment. If the image signal is to be transmitted over e.g. a serial digital interface, standardized as SMPTE259M, the camera output processor generates transmission data, which is in keeping with the image signal transmitted from the selector 25, using the image signal supplied from the selector 25, to output the so generated signal as the signal CMout.

The monitor output processor 35 converts the image signal Du, supplied from the image display control unit 31, into the signal MTout, designed to cope with a liquid crystal display unit 37, to output the resulting converted signal. For example, if the liquid crystal display unit 37 uses analog signals, the monitor output processor converts the image signal Du into an analog signal, which is then output as a signal MTout.

The liquid crystal display unit 37, represented by e.g. a viewfinder, is made up by numerous liquid crystal display elements, and constitutes a display for demonstrating the information to a user. Based on the signal MTout, input from the monitor output processor 35, the liquid crystal display unit 37 effects light modulation of the liquid crystal display device to produce an image to be displayed for the user.

A switching (SW) regulator 36 generates a DC signal Cf, based on a control signal CTbc, supplied from the image display control unit 31 or the controller 50, to output the so generated DC signal to a Royer oscillator 38.

When supplied with the DC signal Cf from the SW regulator 36, the Royer oscillator 38 is self-oscillated to generate an AC signal Ch. The amplitude of the AC signal Ch, generated by this Royer oscillator 38, is governed by the voltage value of the input DC signal. The AC signal Ch is continuously applied to a backlight 39. That is, by controlling the voltage value of the input DC signal, it is possible to change the brightness of illumination of the backlight 39 and hence to adjust the contrast of the image demonstrated on the liquid crystal display unit 37.

The backlight 39 is a phosphor tube which illuminates the light to the back surface of the liquid crystal display devices of the liquid crystal display unit 37 to realize the improved viewing characteristics of the liquid crystal display. The illumination brightness of the light illuminated by the backlight 39 is derived from the applied AC signal Ch.

The operating unit 51 is connected to the controller 50. An operating signal PS is supplied to the controller 50 responsive to actuation of the operating unit 51 by the user. The controller 50 generates various control signals, based on this operating signal PS, to send the so generated control signals to the main line block 11 and to the monitor block 30 to actuate the video camera responsive to the user actuation. The controller 50 is also supplied with a discrimination signal Ha, as later explained, from the image display control unit 31, and, based on this discrimination signal Ha or the operating signal PS, generates the a control signal CTbc, which is then routed to the monitor block 30.

Figure 4:
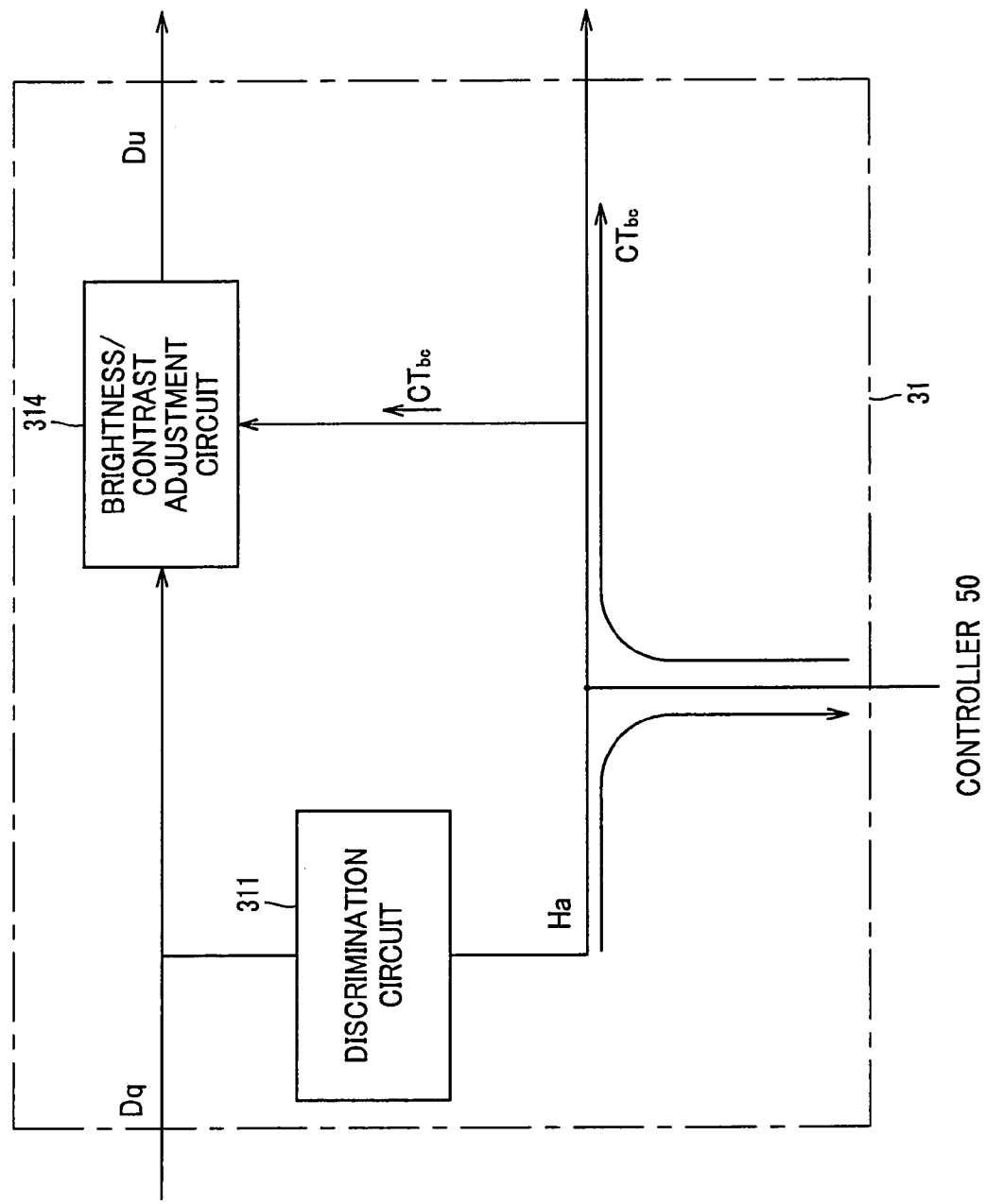
FIG. 4 is a block diagram showing the structure of an image display controller.

The image display control unit 31 is now explained in detail. FIG. 4 shows the structure of the image display control unit 31.

The image signal Dq, supplied from the camera signal processing unit 20, is supplied to a discrimination circuit 311 and to a brightness/contrast adjustment circuit 314. The discrimination circuit 311 executes signal discrimination of the image signal Dq. In this signal discrimination, the signal format of the image signal Dq, lightness or color etc. of the image for photographing, based on the image signal Dq is discriminated to generate the discrimination signal Ha specifying the result of the discrimination. The so generated signal is routed to the controller 50.

The brightness/contrast adjustment circuit 314 controls the luminance signal level, by controlling the gain of the image signal Dq supplied from the camera signal processor 20, based on the control signal CTbc supplied from the controller 50, to enable generation of the image signal of the desired brightness and contrast, thereby adjusting the luminance signal level. The image signal Dq, having its signal level adjusted by this brightness/contrast adjustment circuit 314, is sent as the image signal Du to the monitor output processor 35.

The operations of the image display control unit 31 and the viewfinder 300 in this video camera 100 are hereinafter explained.

First, the image display control unit 31 is supplied with the image signal Dq for monitoring from the camera signal processing unit 20. The so supplied image signals Dq are transmitted to the discrimination circuit 311 and to the brightness/contrast adjustment circuit 314 within the image display control unit 31. The discrimination circuit 311 executes the aforementioned discrimination, based on the received image signal Dq, to send the resulting discrimination signal Ha to the controller 50.

The controller 50 discriminates the various attributes of the image information, such as brightness or color, from the supplied discrimination signal Ha. The controller 50 generates a control signal CTbc, inclusive of a setting value R, responsive to the discriminated results, to send the so generated control signal to the brightness/contrast adjustment circuit 314 and to the SW regulator 36.

On receipt of the control signals CTbc, the brightness/contrast adjustment circuit 314 adjusts the luminance signal level of the image signal Dq in an increasing or in a decreasing direction, responsive to the setting value R contained in the control signals CTbc, to generate the image signal Du. In similar manner, the SW regulator 36 on receipt of the control signals CTbc sends the DC signal Cf to the Royer oscillator 38, as it increases or decreases the voltage value of the DC signal Cf for raising or lowering the illumination brightness of the backlight 39 in dependence on the setting value R contained in the control signal CTbc.

The brightness/contrast adjustment circuit 314 and the SW regulator 36 cooperate with each other to generate the image signal Du and the DC signal Cf. That is, the contrast of the image displayed on the liquid crystal display unit 37 is controlled by both the luminance signal level output as the image signal Du and the illumination brightness of the light illuminated by the backlight 39 in a correlated fashion. It should be noted that, since the illumination brightness of the light illuminated by the backlight 39 is notified from time to time to the SW regulator 36, it is possible for the SW regulator 36 to perform feedback control of the voltage value of the DC signal Cf based on this notification.

Meanwhile, the brightness/contrast adjustment circuit 314 and the SW regulator 36 are controlled by the setting value R contained in the control signal CTbc, in a correlated fashion, as described above. For example, if the luminance signal level, adjusted by the brightness/contrast adjustment circuit 314, and the voltage value, controlled by the SW regulator 36, are uniquely determined responsive to the setting value R, the above-mentioned correlated control may be achieved with the sole setting value R by previous setting of the luminance signal level and the voltage value of the DC signal Cf with respect to the setting value R.

Meanwhile, the smallest value of the illumination brightness of the backlight 39 is limited from the perspective of maintaining the stable discharge current. In other words, since the smallest value of the illumination brightness of the backlight 39 is determined in dependence on the stable discharge current, the variable contrast range by the SW regulator 36 is limited to be a predetermined range. However, according to the present invention, in which the luminance signal level contained in the image signal Du and the voltage value contained in the DC signal Cf can be controlled in a correlated fashion to each other, an image of a desired contrast may be demonstrated via the liquid crystal display unit 37 even in case the possible range of the contrast variation by the SW regulator 36 is exceeded, on the condition that the luminance signal level is accordingly changed.

For example, if the image signal Dq of a black level is supplied, the SW regulator 36, receiving the setting value R, lowers the voltage value of the DC signal Cf for lowering the illumination brightness within its own range of possible contrast variation. On the other hand, the brightness/contrast adjustment circuit 314 adjusts the luminance signal level in the lowering direction for the range of the contrast variation not taken care of by the SW regulator 36 to generate the image signal Du. Thus, even if the image signal of the black level is supplied, both the illumination brightness of the backlight 39 and the luminance signal level of the displayed image may be lowered in a correlated fashion, with the consequence that there is no risk of 'floated' display of the black level as in the conventional technique, thereby improving the viewing characteristics of the entire image.

That is, according to the present invention, the luminance signal level contained in the image signal Du and the voltage value DC signal Cf may be controlled in a correlated fashion to effect flexible contrast adjustment of the image actually demonstrated on the liquid crystal display unit 37. The brightness of the displayed image as viewed by a user is represented by the product of the illumination brightness of the backlight 39 and the luminance signal level. Thus, even when an image signal different than the black level is supplied, a desired contrast may be achieved of the image demonstrated on the liquid crystal display unit 37 by controlling the level of the luminance signal and the illumination brightness in a correlated fashion to each other.

It is noted that the above-described embodiment is merely illustrative and is not intended to limit the invention. The correlated control of the brightness/contrast adjustment circuit 314 and the SW regulator 36 is not limited to the case in which the correlated control is exercised through the setting value R contained in the control signal CTbc. For example, such the control may be realized by communication between the brightness/contrast adjustment circuit 314 and the SW regulator 36.

The present invention may be applied not only to the case of the video camera 100 having the imaging unit 12, but also to an image display controlling apparatus in which an image signal photographed with other imaging apparatus is input and an image corresponding to the image signal is demonstrated on the liquid crystal display surface as the input image signal is adjusted in contrast.

Figure 5:
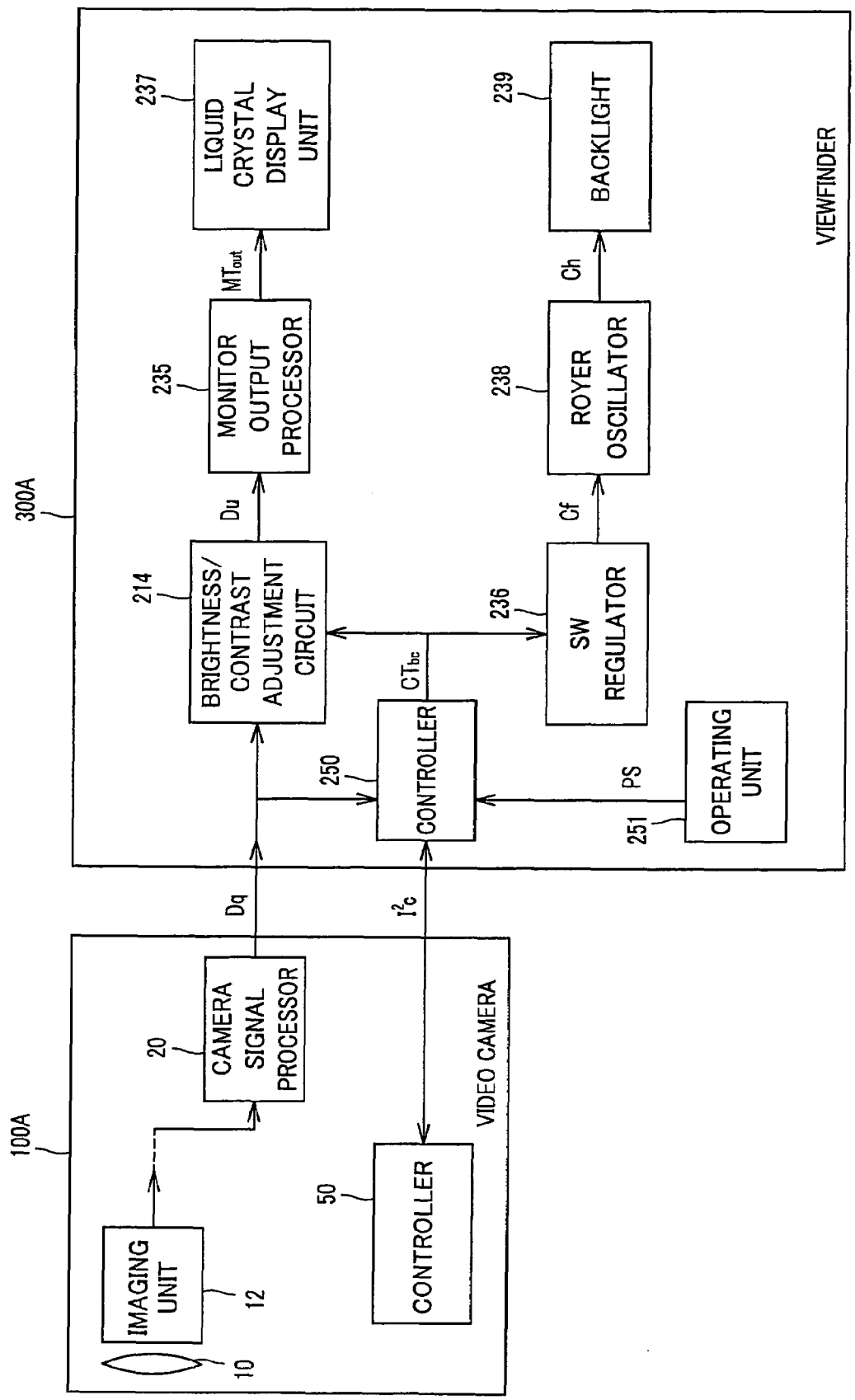
FIG. 5 is a block diagram showing the structure of a viewfinder device.

The present invention may also be applied to a viewfinder device 300A configured as shown in FIG. 5.

The viewfinder device 300A shown in FIG. 5 includes a brightness/contrast adjustment circuit 214 for adjusting the brightness or contrast of an image signal Dq supplied from the camera signal processing unit 20 provided to a video camera 100A, and a monitor output processor 235 for converting an image signal Du supplied from the brightness/contrast adjustment circuit 214 into a signal MTout, which is in keeping with a liquid crystal display unit 237, and for outputting the so converted signal. The viewfinder device also includes the liquid crystal display unit 237 for effecting light modulation of liquid crystal display elements based on the signal MTout supplied from the monitor output processor 235 for demonstration to the user, and a controller 250 for controlling various parts of the viewfinder device 300A. The viewfinder device also includes an operating unit 251 for supplying an operating signal SP to the controller responsive to user actuation and an SW regulator 236 for generating the DC signal Cf based on the control signal CTbc supplied from the controller 250. The viewfinder device also includes a Royer oscillator 238 for being self-oscillated responsive to an input DC signal Cf to generate an AC signal Ch, and a backlight 239. These various components of the viewfinder device 300A are the same as those of the corresponding components of the video camera 100 and hence are not explained specifically.

In this viewfinder device 300A, the controller 250 has communication functions by e.g. an $I^2C$ bus for exchanging the control information with the controller 50 of the video camera 100A. Based on the above communication functions, the controller 250 inquires the video camera 100A as to whether or not there is provided the function of controlling the luminance signal level and/or as to whether or not there is provided the function of controlling the illumination brightness of the backlight 239. If, as a result, the video camera 100A has the function of controlling the luminance signal level and/or the function of controlling the illumination brightness of the backlight 239, the controller 250 prompts the controller 50 to transmit a signal (CTBC) for making contrast adjustment. If there is no response from the video camera 100A, the controller 250 gives a judgment that there is provided no control function of adjusting the contrast and produces the control signal CTbc in order that the viewfinder device 300A itself prosecutes contrast adjustment.

With the above-described viewfinder device 300A, it is possible to make flexible contrast adjustment of the image demonstrated on the liquid crystal display unit without dependency on the performance of the video camera 100A.

The invention claimed is:

1. An image display controlling apparatus for adjusting the contrast of an image, said apparatus comprising:
   discriminating means for receiving an image signal, for discriminating a signal format of the image signal, the signal format including at least one of lightness of the image and color of the image, and for generating a discrimination signal based on the result of said discriminating;
   controller means for receiving the discrimination signal and for generating a control signal based on the received discrimination signal;
   level adjustment means for receiving the control signal and for adjusting a luminance signal level of the image signal based on the received control signal;
   display means for displaying an image in accordance with the adjusted luminance signal level;
   illuminating means for illuminating said display means, the brightness of the illumination provided by said illuminating means having a predetermined range below which stable discharge current cannot be maintained by said illuminating means; and
   illumination controlling means, including:
      switching regulator means for receiving the control signal, for periodically receiving notification of the brightness of the illumination provided by said illuminating means, and for generating a DC signal based on the received control signal and the periodically received notification of the brightness of the illumination provided by said illuminating means, and
      oscillator means for receiving the DC signal and for controlling the brightness of the illumination provided by said illuminating means based on the received DC signal;
   the control signal including a setting value associated with a particular image contrast such that if the setting value would require said illumination controlling means to lower the illumination brightness to be below the predetermined range, said illumination controlling means instead maintains the illumination brightness within the predetermined range to maintain the stable discharge current and said level adjustment means lowers the luminance signal level according to the setting value until the particular image contrast associated with the setting value is attained.

2. The image display controlling apparatus according to claim 1, further comprising:
   display image generating means for converting the image which is in accordance with the adjusted luminance signal level into a signal matched to said display means.

3. The image display controlling apparatus according to claim 1, wherein said display means is a liquid crystal display.

4. An image display controlling method for adjusting the contrast of an image, said method comprising:
   discriminating a signal format of an image signal, the signal format including at least one of lightness of the image and color of the image, and generating a discrimination signal based on the result of said discriminating step;
   generating a control signal based on the discrimination signal;
   adjusting a luminance signal level of the image signal based on the control signal;
   displaying an image in accordance with the adjusted luminance signal level;
   providing illumination for the displayed image, the brightness of the illumination having a predetermined range below which stable discharge current cannot be maintained;
   periodically receiving notification of the brightness of the brightness of the illumination provided for the displayed image;
   generating a DC signal based on the control signal and the periodically received notification of the brightness of the illumination; and
   controlling the brightness of the illumination provided for the displayed image based on the DC signal;
   the control signal including a setting value associated with a particular image contrast such that if the setting value would require the illumination brightness be below the predetermined range, said illumination step instead maintains the illumination brightness within the predetermined range to maintain the stable discharge current and said adjusting step lowers the luminance signal level until the particular image contrast associated with the setting value is attained.

5. The image display controlling method according to claim 4, wherein the displayed image which is in accordance with the adjusted luminance signal level is converted into a signal matched to a display unit.

6. The image display controlling method according to claim 4, wherein the displayed image is displayed using a liquid crystal display.

7. An imaging apparatus, comprising:
   image signal generating means for imaging an object to generate an image signal;
   discriminating means for receiving the image signal, for discriminating a signal format of the image signal, the signal format including at least one of lightness of the image and color of the image, and for generating a discrimination signal based on the result of said discriminating;
   controller means for receiving the discrimination signal and for generating a control signal based on the received discrimination signal;
   level adjustment means for receiving the control signal and for adjusting a luminance signal level in the input image signal based on the received control signal;
   display means for displaying an image in accordance with the adjusted luminance signal level;
   illuminating means for illuminating said display means, the brightness of the illumination provided by said illuminating means having a predetermined range below which stable discharge current cannot be maintained by said illuminating means; and
   illumination controlling means, including:
      switching regulator means for receiving the control signal, for periodically receiving notification of the brightness of the illumination provided by said illuminating means, and for generating a DC signal based on the received control signal and the periodically received notification of the brightness of the illumination provided by said illuminating means, and
      oscillator means for receiving the DC signal and for controlling the brightness of the illumination provided by said illumination means based on the received DC signal;

the control signal including a setting value associated with a particular image contrast such that if the setting value would require said illumination controlling means to lower the illumination brightness to be below the predetermined range, said illumination controlling means instead maintains the illumination brightness within the predetermined range to maintain the stable discharge current and said level adjustment means lowers the luminance signal level according to the setting value until the particular image contrast associated with the setting value is attained.

8. The imaging apparatus according to claim 7, further comprising display image generating means for converting the image which is in accordance with the adjusted luminance signal level into a signal matched to said display means.

9. The imaging apparatus according to claim 7, wherein said display means is a liquid crystal display.

10. A viewfinder device for viewing an image based on an image signal provided by an imaging apparatus, said viewfinder device comprising:

discriminating means for discriminating a signal format of the image signal, the signal format including at least one of lightness of the image and color of the image, and for generating a discrimination signal based on the result of said discriminating;

controller means for receiving the discrimination signal and for generating a control signal based on the received discrimination signal;

level adjustment means for receiving the control signal and for adjusting a luminance signal level of the image signal based on the received control signal;

display means for displaying an image in accordance with the adjusted luminance signal level;

illuminating means for illuminating said display means, the brightness of the illumination provided by said illuminating means having a predetermined range below which stable discharge current cannot be maintained by said illuminating means; and illumination controlling means, including:

switching regulator means for receiving the control signal, for periodically receiving notification of the brightness of the illumination provided by said illuminating means, and for generating a DC signal based on the received control signal and the periodically received notification of the brightness of the illumination provided by said illuminating means, and oscillator means for receiving the DC signal and for controlling the brightness of the illumination provided by said illuminating means based on the received DC signal;

the control signal including a setting value associated with a particular image contrast such that if the setting value would require said illumination controlling means to lower the illumination brightness to be below the predetermined range, said illumination controlling means instead maintains the illumination brightness within the predetermined range to maintain the stable discharge current and said level adjustment means lowers the luminance signal level according to the setting value until the particular image contrast associated with the setting value is attained.

11. The viewfinder device according to claim 10, further comprising:

displayed image generating means for converting the image which is in accordance with the adjusted luminance signal level into a signal matched to said display means.

12. The viewfinder device according to claim 10, wherein said display means is a liquid crystal display.

13. The viewfinder device according to claim 10, wherein said controller means includes means for exchanging the control information with said imaging apparatus, and the viewfinder device makes an inquiry to the imaging apparatus as to whether the imaging apparatus is controlling, to adjust the contrast of the displayed image, at least one of the brightness of the illumination and the luminance signal level of the image signal.

* * * * *